Figure 1:
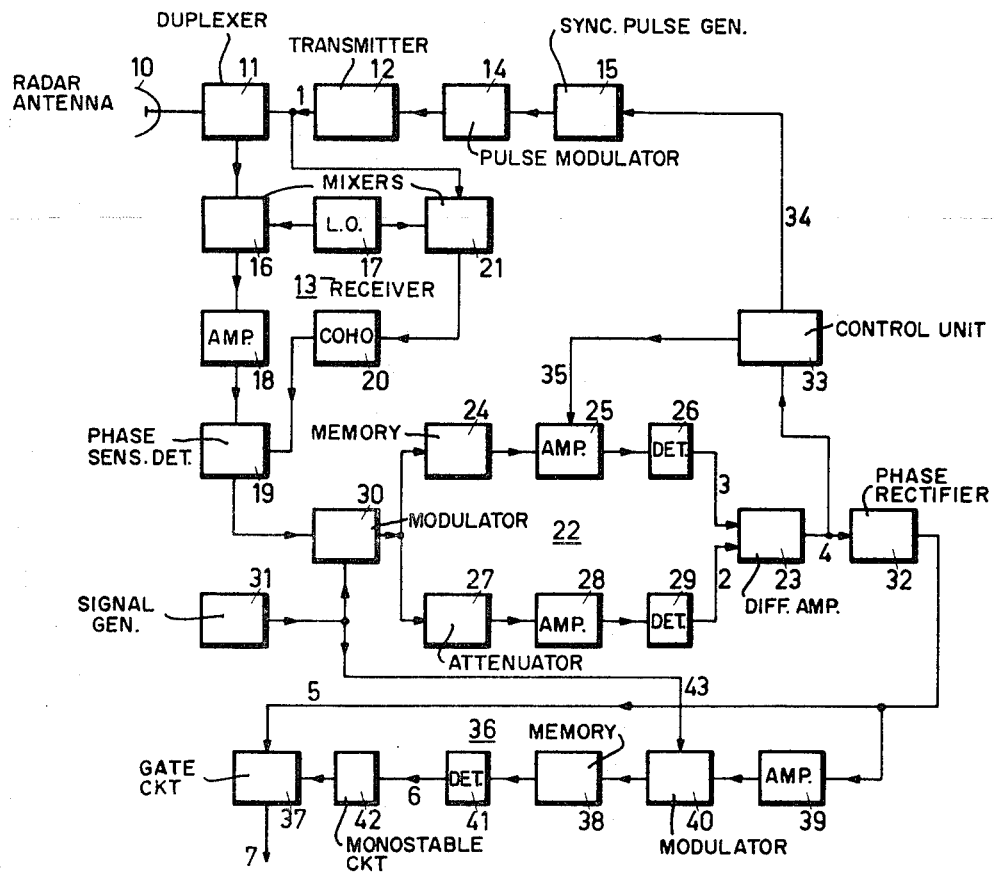

United States Patent [19] [11] 3,713,153
van Popta [45] Jan. 23, 1973

[54] PULSE RADAR SYSTEM FOR DETECTING MOVING TARGETS

[75] Inventor: Yftinus Frederik van Popta, Hengelo, Netherlands

[73] Assignee: N. V. Hollandse Signaalapparaten, Hengelo, Netherlands

[22] Filed: June 1, 1970

[21] Appl. No.: 42,232

[30] Foreign Application Priority Data

June 6, 1969 Netherlands ..................6908606

[52] U.S. Cl. ...............................343/7.7, 343/18 E
[51] Int. Cl. ...............................................G01s 9/42
[58] Field of Search ...........................343/7.7, 18 E

[56] References Cited

UNITED STATES PATENTS

| 3,042,915 | 7/1962 | Nordell | 343/7.7 |
| 3,066,289 | 11/1962 | Elbinger | 343/7.7 |
| 3,134,101 | 5/1964 | Dickey, Jr. | 343/7.7 |
| 3,220,002 | 11/1965 | Shrader | 343/7.7 |
| 3,507,992 | 4/1970 | Foote | 343/7.7 X |

Primary Examiner—Malcolm F. Hubler
Attorney—Frank R. Trifari

[57] ABSTRACT

A pulse radar system for the detection of moving targets, comprising a clutter suppression system for the elimination of echoes of fixed objects of echoes of objects with smaller radial speeds connected to the output of the receiver and a suppression system for random jamming signals connected to the output of the clutter suppression system. The clutter suppression system comprises two signal processing channels connected to a difference amplifier; one channel having at least one memory for the introduction of a fixed delay. The suppression system for random jamming signals comprises a signal processing channel and a non-processing channel connected to a gate circuit and a memory in one of the two channels for delaying the echoes passing through the channel as well as any jamming signals relative to signals passing through the other channel with a duration which is a number of times one pulse repetition period greater than the duration of the maximum delay to which the signals in the clutter suppressor are subjected.

1 Claim, 2 Drawing Figures

PULSE RADAR SYSTEM FOR DETECTING MOVING TARGETS

The invention relates to a pulse radar system for detecting moving targets, which system is provided with a transmitter for transmitting, with a fixed pulse repetition period T, successive pulses, a receiver for the coherent detection of echoes corresponding to said pulses and a device connected to the output of the receiver, using at least a memory for introduction, a fixed delay and a difference amplifier, to eliminate echoes of fixed objects, or echoes of objects with a small radial velocity.

Pulse radar systems of the above type are known. The device for the elimination of echoes of fixed objects, in the following called "clutter suppressor" for short, may be of various designs. In its simplest form the clutter suppressor comprises two channels fed with the coherently detected echoes of the receiver, a difference amplifier connected to the output of each of the two channels, and a memory included in one of these channels, which delays echoes passing through this channel with respect to echoes passing through the other channel for a time equal to one pulse repetition period T. Said memory may consist of a static memory such as for instance a register or of a running memory, such as for instance a drum memory or a delay line. Instead of such a simple clutter suppressor, a double clutter suppressor is frequently used in practice or even a triple one. These multiple clutter suppressors consist basically of two or more consecutively switched single clutter suppressors.

The operation of such a single or multiple clutter suppressor is based on the subtraction from one another of coherently detected echoes occurring periodically in successive pulse repetition intervals and also of the subsequent forming of the differences of the differences. A serious disadvantage inherent to this operation of the clutter suppressor lies in the fact that a signal not occurring periodically, for example a random jamming pulse, is not only not suppressed, but even occurs some times at the output of the clutter suppressor. With a single clutter suppressor this occurs twice, viz. one time direct and one time delayed with a duration T. This is even three times with the double clutter suppressor much used in practice, viz. one time direct, one time delayed with a duration T and one time delayed with a duration 2T.

It is the object of the invention to provide a pulse radar system which not only suppresses all clutter echoes but also all random jamming pulses. According to the invention a pulse radar system of the type described above is for this purpose provided with a device to suppress a random jamming signal, which device comprises two channels connected to the output of said clutter suppression device and a coincidence circuit connected to the output of each of the two channels and also a memory in one of the two channels which delays echoes passing through this channel, as well as any jamming signals, with respect to the signals passing through the other channel for a time which is a number of times one pulse repetition period T greater than the duration of the maximum delay to which the signals in said clutter suppressor are subjected.

Figure 2:
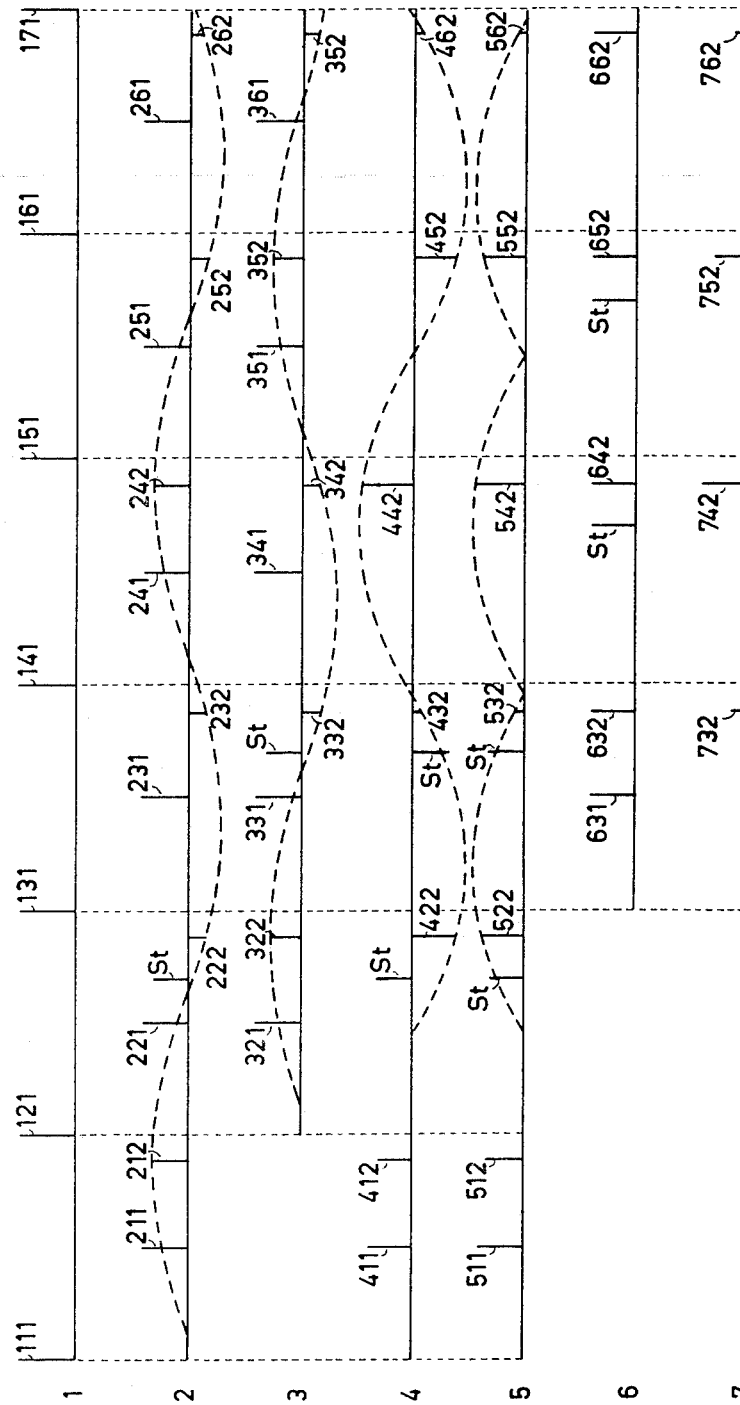

The invention and its advantages are further explained by means of the figures of which:

FIG. 1 shows block-diagrammatically a possible embodiment of a pulse radar system according to the invention and FIG. 2 shows a number of time sequence diagrams to explain the operation of the pulse radar system shown in FIG. 1.

In FIG. 1 10 denotes a radar antenna connected via a duplexer 11 to a transmitter 12 and a receiver 13. The transmitter, which is constituted by a magnetron-oscillator, supplies, controlled by a pulse modulator 14, successive pulses whose fixed pulse repetition period T is determined by the synchronization pulses of a sync pulse generator 15, which are fed to said pulse modulator 14.

Receiver 13 is equipped for the coherent detection of echoes corresponding to said transmitted pulses. It comprises a mixer 16 connected to the output of duplexer 11, in which the RF echo signals received are mixed with the output signal of a stable local oscillator 17. The IF output signal of mixer 16 is fed via amplifier 18 to a phase-sensitive detector 19, which is also supplied with the output signal of a coherent oscillator 20, as a reference signal. The phase of this reference signal should be synchronized with the phase of this transmitter pulse, each time when a transmitter pulse occurs. For this purpose part of the transmitted signal is mixed in the second mixer 21 with the output signal of the stable local oscillator 17, whereby this mixer supplies an intermediate frequency signal whose phase is determined by the phase of the transmitter pulse. This intermediate frequency signal is fed to the coherent oscillator in such a way that this oscillator is forced to assume the same phase.

The output video of the phase-sensitive detector 19 is proportional to the mutual phase difference of the two input signals. The echoes of fixed targets, therefore, remain constant, but the echoes of moving targets vary in amplitude from pulse to pulse in accordance with the doppler frequency shift. In order to be able to derive the doppler information from the output video of the phase sensitive detector 19, these signals are supplied to clutter suppressor 22. In the embodiment shown the latter comprises two channels 2 and 3, and a difference amplifier 23 connected to the output of these channels. Channel 3 comprises successively a memory in the form of a delay line 24, an amplifier 25 and a detector 26. Channel 2 is a normal channel. It comprises successively an attenuator 27, an amplifier 28 and a detector 29. The delay line included in channel 3 consists, in the embodiment given, of an acoustic delay line. In view of this the common input circuit for both channels contains a modulator 30 to which on the one hand the output signal of a signal generator 31 is supplied and on the other hand the video output signals of phase-sensitive detector 19, which latter signals are converted in the modulator into IF-signals, which in their turn are converted into acoustic signals by means of the converter constituting the input of the delay line. The output of difference amplifier 23 is connected on the one hand to double phase rectifier 32 which converts the bipolar input signal into the unipolar signal and on the other hand to a control unit 33, which supplies a time control signal to sync pulse generator 15 via lead 34 and which supplies a voltage for automatic gain control to amplifier 25 via lead 35.

The clutter suppressor operates as a filter, which eliminates the d.c. current component of the fixed targets and passes the a.c. current component of the moving targets. The treatment to which the signals are subjected in the clutter suppressor for this purpose is further explained by means of diagrams 1 through 4 shown in FIG. 2. These diagrams give the amplitudes as a function of time. The various diagrams are denoted in FIG. 2 by the same reference numerals as the channels in FIG. 1 in which these signals occur.

Diagram 1 shows pulses 111, 121, 131, 141, 151, 161 and 171, transmitted by the transmitter with a fixed pulse repetition period T.

Diagram 2 represents the video signals which occur in channel 2 at the input of difference amplifier 23. Video signals 211, 221, 231, 241, 251 and 261 correspond with the reflections of a fixed target and video signals 212, 222, 232, 242, 252 and 262 to the reflections of a moving target, while video signal St corresponds with a received random jamming pulse.

Diagram 3 represents the video signals that occur in channel 3 at the input of the difference amplifier. The video signals fed via this channel are subjected to a delay, the duration of which is equal to one pulse repetition period T. In this diagram video signals 321, 331, 341, 351 and 361 correspond with the said reflections of the fixed target and video signals 322, 332, 342, 352 and 362 correspond to the said reflections of the moving target. Video signal St corresponds to said jamming pulse.

Diagram 4 shows the video signals that occur in channel 4 at the output of the difference amplifier 23. In this diagram video signal 411 corresponds with a reflection of said fixed target and 412, 422, 432, 442, 452 and 462 correspond with said reflections of the moving target. Video signals of the fixed target occurring in channels 2 and 3 are eliminated by the difference amplifier. Video signal St corresponding with said jamming pulse is not eliminated but occurs even twice at the output of the difference amplifier, as shown in diagram 4.

A particularly favorable and in every way advantageous system is obtained if it is provided, in accordance with the invention, with a device 36 (FIG. 1), to suppress the random jamming pulses, which device comprises two channels 5 and 6 connected to the output of the clutter suppressor, and a gate circuit 37, connected to the output of these channels, and also a memory 38 in one of the two channels, which delays the signals passing through this channel by a time which is a number of times one pulse repetition period larger than the duration of the maximum delay to which the signals in the clutter suppressor are subjected. In the embodiment shown, channel 5 forms a direct connection between the output of rectifier 32 and an input of the gate circuit 37. Channel 6 constitutes the connection between the output of rectifier 32 and an input circuit 42 of gate circuit 37. Channel 6 contains in succession an amplifier 39 connected to the output of rectifier 32, a modulator 40, said memory 38 and a detector 41 whose output is connected to said input circuit of gate circuit 37. This gate circuit passes a signal supplied through channel 5 only, if its input circuit 42 constituted by a monostable circuit has been momentarily changed from the one into the other state of equilibrium by an approximately simultaneously occurring output signal of detector 41.

As the maximum delay to which the signals in the clutter suppressor 22 are subjected, is equal to the duration of one pulse repetition period T, the memory 38 available in channel 6 of the jamming pulse suppressor is so designed that it effects a delay with a duration equal to 2T. In this way it is attained that the jamming pulse suppressor 36 supplies an output pulse only on receipt of at least three video signals occurring with a mutual time difference T. As the clutter suppressor 22 in the embodiment shown supplies only two video signals St for each received random jamming pulse with a common time difference T, these pulses are completely suppressed by jamming pulse suppressor 36.

In the embodiment shown, memory 38 as well as delay line 24 consists of an acoustic delay line. In view of this, the output signals of rectifier 32, after having been amplified in amplifier 39, are fed to modulator 40, which is also supplied with the output signal of signal generator 31 via lead 43. Modulator 40 converts the output pulses of amplifier 39 to an IF-signal that is supplied to delay line 38. The output signal of the delay line is supplied, after detection in detector 41, to input circuit 42 of gate circuit 37.

The jamming pulse suppressor 36 passes the video signals corresponding with a moving target, with the exception of the first video signal, and suppresses the video signals which correspond with a random jamming pulse. The treatment to which the signals are subjected for this purpose in the jamming pulse suppressor is shown by means of diagrams 5 to 7 given in FIG. 2.

Diagram 5 represents the unipolar video signals, which occur in channel 5 at the input of gate circuit 37. In this diagram video signal 511 corresponds with a reflection of the fixed target and video signals 512, 522, 532, 542 and 552 correspond with reflections of a moving target, while the two video signals denoted by St correspond with one single received random jamming pulse.

Diagram 6 represents signals delayed with a duration 2T, as they occur in channel 6, at input circuit 42 of gate circuit 37. In this diagram signals 632, 642, 652 and 662 correspond with said reflections of the moving target and the signals denoted by St correspond with said jamming pulses. Video signal 631 corresponds with a fixed target.

Diagram 7 shows the unipolar video signals which occur in channel 7 at the output of the gate circuit 37. Video signals 732, 742, 752 and 762 correspond with said reflections of the moving target. The jamming signals St and video signal 631 occurring in channels 5 and 6 are eliminated by the gate circuit because they cannot occur simultaneously at the inputs of the gate circuit, as a consequence of the introduced delay.

In the embodiment described above the jamming pulse suppressor is adapted to the single clutter suppressor applied in the radar system. When a multiple clutter suppressor is applied, the jamming pulse suppressor should be adapted too, in that sense, that if the maximum delay introduced into the clutter suppressor is equal to $n \cdot T$, the delay introduced into the jamming pulse suppressor must be equal to $(n+1)T$, where $n =$ an integral number and $T =$ one pulse repetition period.

We would further point out here that the delay in the clutter suppressor and the delay in the jamming pulse suppressor can only be introduced by means of one and the same delay line, provided this delay line has a sufficient bandwidth, so that several delay channels can be formed each taking up part of the total bandwidth.

It may finally be remarked that the invention is not limited to the application of a running memory in the form of an acoustic delay line, but that other well-known memories may also be used, such as for instance a drum memory.

What we claim is:

1. A pulse radar system for the detection of moving targets, comprising an antenna, a transmitter coupled to said antenna for transmitting successive pulses having a fixed pulse repetition period, a receiver coupled to said antenna and said transmitter for coherently detecting receiver pulses corresponding to said transmitted pulses, a first device connected to the output of said receiver for the elimination of echoes of fixed objects and objects with low radial speeds, said first device comprising first signal input means, and two signal processing channels coupled to said first signal input means, one of said signal processing channels comprising first memory means for introducing a fixed delay therein, a difference amplifier connected to the outputs of the signal processing channels of said first device, rectifying means coupled to said difference amplifier, a second device connected to the output of said rectifying means for suppressing random jamming signals, said second device comprising second signal input means, and two channels coupled to said second signal input means, one of said channels providing for signal processing and the other channel providing for direct connection of the output of said rectifying means, said signal processing channel comprising second memory means for introducing a delay therein, said delay being a number of times that the pulse repetition period is greater than the duration of the maximum delay of the memory means of said first device, and a gate circuit coupled to said second device and having as its output only those signals occuring simultaneously at the outputs of the two channels of said second device.

* * * * *